3,052,670
PROCESS FOR PREPARING α-AMINO-ω-LACTAMS
Johannes H. Ottenheym, Sittard, and Willem Pesch and Ulrich Verstrijden, Geleen, Netherlands, assignors to Stamicarbon N.V., Heerlen, Netherlands
No Drawing. Filed Aug. 1, 1960, Ser. No. 46,364
Claims priority, application Netherlands Aug. 6, 1959
7 Claims. (Cl. 260—239.3)

The present invention relates to the preparation of α-amino-ω-lactams by reduction of α-nitro-ω-lactams with hydrogen.

It has previously been proposed to reduce α-nitro-ω-lactams in suspension in an inert liquid, such as water and/or a water-miscible alcohol. Although this prior method gives excellent results on a batch or laboratory scale, it is less suitable for continuous operations. The principal difficulties stem from the fact that the suspension must be prepared outside the reaction vessel and must then be brought into the circuit by means of slurry pumps, during which process it is difficult to prevent clogging of the pumps. Moreover, it is also necessary to use more viscous distributing liquids, such as cyclohexanol, in which the suspension settles more slowly, and which are difficult to remove from the reaction mixture.

The above noted objections cannot be obviated by simply dissolving the nitrolactam in an inert liquid solvent therefor because the nitrolactam has only a relatively low solubility in conventional solvents. Thus, for example, if hot ethanol is used as a solvent, only a 10% nitrolactam solution is obtained. Working with such low concentrations is not attractive from an economic point of view, as the apparatus needed is too large.

The principal object of the present invention is to provide an improved process for preparing α-amino-ω-lactams whereby the aforementioned difficulties are obviated. Other objects will also be hereinafter apparent.

Broadly stated, the objects of the invention are realized by using, as the nitrolactam component, a water-soluble salt of the aciform of the α-nitro-ω-lactam and reducing this salt in aqueous solution with hydrogen.

It has been found that the process described in the preceding paragraph offers the advantage that, when the process is carried out continuously, a concentrated solution of the nitrolactam, rather than a suspension thereof, can be readily pumped to the reaction vessel, thus simplifying operations from a technical point of view.

According to the invention, it is possible to use any salt of the aci-form of the nitrolactam that is well-soluble in water, i.e. sufficiently soluble to form at least a 15% solution in water at 20–25° C. This includes the potassium and sodium salts, as well as the salts from organic bases, such as aniline and other amines. Preferably, use is made of salts from those bases which, after completion of the reduction, can be separated from the aminolactam in a simple way.

It is specially desirable to use the ammonium salt of the nitrolactam, as the ammonia liberated during the reaction can be very easily expelled from the solution owing to its volatility. The ammonium salts of the nitrolactams can be prepared in a simple way. Thus it has been found that the nitrolactams dissolve very readily in both a diluted and a concentrated aqueous solution of ammonia, in which process they are converted into the ammonium salt of the aci-form. The simplest way is to prepare the solution at room temperature (20–25° C.), in which case a concentration of over 45% can be reached. However, higher or lower temperatures may also be used.

An amount of ammonia equivalent to the amount of nitrolactam suffices to dissolve the nitrolactam. However, if a larger amount of ammonia is used, it is recommended that the excess of ammonia be expelled from the resulting nitrolactam solution before this is reduced. It appears that a surplus of ammonia in the solution subjected to reduction increases the catalyst consumption. The ammonia may be expelled in any desirable way, e.g. by sucking it off at room temperature.

To dissolve the nitrolactam, use is preferably made of aqueous ammonia of such a concentration that, by dissolving in it an equivalent amount of nitrolactam, a 30 to 45% nitrolactam solution is obtained.

Another very desirable way of carrying out the present process comprises reduction of the water-soluble salt obtained by treating α-nitrolactam with the corresponding α-aminolactam. As the compound to be produced by the reduction is used in the form of a base to prepare the salt subjected to reduction, there is no problem of separating the resulting aminolactam from the base used for the salt formation. In addition, the reduction takes place almost quantitatively at a temperature which is 20–30° C. lower, thus considerably reducing the chance of hydrolysis of the resulting aminolactam. Furthermore, when used in excess, the aminolactam, in contradistinction to ammonia, has no unfavorable influence on the catalyst consumption.

The salt from the nitrolactam and the aminolactam can be prepared by dissolving the aminolactam in water and adding the nitrolactam to the resulting solution. However, if equimolar amounts of the two substances are used, the nitrolactam hardly dissolves, even at high temperatures. It is therefore recommended that an excess of aminolactam be used.

Preferably, the nitrolactam is first dissolved in an aqueous solution of ammonia, after which the resulting ammonium salt is converted into the aminolactam salt. Thus, the nitrolactam can be dissolved in the ammonia solution in the way described above. By addition of aminolactam to the solution, the ammonium salt formed can be converted into the aminolactam salt. An amount of aminolactam equivalent to the amount of nitrolactam suffices for this purpose. When all of the material has dissolved, the ammonia liberated is expelled from the solution, e.g. by sucking it off in vacuo. This is preferably done at a temperature of 20–50° C., although higher or lower temperatures may also be used.

The salt solutions obtained according to the invention may be reduced in various ways. Not only molecular hydrogen, but also atomic hydrogen may be used. Furthermore, the reduction may be carried out by means of hydrogenation catalysts, such as Raney nickel, Raney cobalt, platinum, palladium, and other metals of metal compounds.

The reduction is preferably carried out with hydrogen at elevated pressure in the presence of a hydrogenation catalyst. In this way an almost complete conversion is effected within a short period, in general within 15–30 minutes. The pressure may be varied within wide limits, e.g. between 20 and 300 atm., or even higher. The reaction temperature may be varied between 50 and 150° C. At temperatures above 150° C. there is the danger of decomposition.

After completion of the reaction the catalyst can be separated, e.g., by filtration from the aqueous solution, and the aminolactam can subsequently be obtained by evaporation from the solution.

The invention is illustrated but not limited by the following examples:

*Example 1*

An α-nitro-ε-caprolactam solution of approximately 40% concentration is prepared at room temperature by dissolving 238 g. of α-nitro-ε-caprolactam in 360 g. of 7.2% aqueous ammonia. This solution is gradually pumped into an autoclave provided with a magnetic stirrer and containing fresh Raney nickel (10% with respect to the nitrolactam) in water, under 90 atm. hydrogen pressure.

At first the autoclave is heated. When the temperature of the water in it has risen to 50° C., the nitrolactam solution is pumped in. At about 85° C., the reaction starts, which can be noticed by the decrease of the hydrogen pressure. Then, the reaction temperature is kept at 85 to 100° C. by cooling. The total hydrogenation time is 1 hour. After the total amount of solution has been added, the reaction is allowed to continue for half an hour.

Finally, the autoclave is cooled to 20° C. The reaction mixture is filtered and the catalyst mass is washed with water. The washing water is added to the filtrate. After evaporation of the water, 189.2 g. of α-amino-ε-caprolactam (corresponding with a yield of 98.2%) and 4 g. of lysine are obtained from the resulting solution. Consequently, the nitrolactam has been hydrogenated to 100%.

*Example 2*

148 g. of α-nitro-ε-caprolactam is dissolved at room temperature in 360 ml. of a 10% solution of ammonia in water. To the clear solution 125.0 g. of α-amino-ε-caprolactam is added. When all of the material has dissolved, the ammonia liberated is sucked off in vacuo at 30° C. This solution is gradually pumped, at a hydrogen pressure of 90 atm., into an autoclave provided with a magnetic stirrer and containing fresh Raney nickel (10% with respect to the nitrolactam) in water.

At first the autoclave is heated. When the temperature of the water in it has risen to 45° C., pumping in of the nitrolactam solution is started. At about 55° C. the reaction starts, which can be noticed by the decrease of the hydrogen pressure. Then the reaction temperature is kept at 55 to 80° C. by cooling. The total time of hydrogenating amounts to 1 hour. After the total amount of solution has been added, the reaction is allowed to continue for 15 minutes.

Finally, the autoclave is cooled at 20° C. The reaction mixture is filtered and the catalyst mass is washed with water. The washing water is added to the filtrate. After evaporation of the water 243.6 g. of α-amino-ε-caprolactam, 1.0 g. of non-converted α-nitro-ε-caprolactam, and 0.9 g. of lysine are isolated from the resulting solution.

Consequently, 118.6 g. of α-amino-ε-caprolactam has been formed by the reduction, which corresponds with a yield of 99.0%.

*Example 3*

An α-nitro-ζ-oenantholactam solution of approximately 30% concentration was prepared at room temperature by dissolving 95 g. of α-nitro-ζ-oenantholactam in 225 g. of 4.2% aqueous ammonia. This solution was further treated following the procedure described in Example 1. In this way 76.5 g. were obtained of a white, hygroscopic product, easily attracting carbon dioxide from the air, which was identified as α-amino-ζ-oenantholactam. The yield was 97.5%. This compound has not been described before in literature.

The product was dissolved in 100% ethanol and into this solution dry gaseous hydrogen chloride was led. The resulting precipitate was recrystallized from 100% ethanol. The α-amino-ζ-oenantholactam monohydrochloride so obtained was a white crystalline product, melting at 310–312° C., under decomposition.

The term "aci-form" as used above is intended to mean the tautomeric form of the nitrolactam, wherein the $NO_2$-group is present in the form

which has acid properties.

It will be appreciated that various modifications may be made in the invention described herein. For example, while the invention has been particularly described in connection with the preparation of α-amino-ε-caprolactam and α-amino-ζ-oenantholactam, other aminolactams, e.g. aminolactams containing 11 or 12 carbon atoms may be similarly prepared using the present process and appropriate starting material.

Accordingly, the scope of the invention is set forth in the appended claims wherein:

We claim:

1. In a process for preparing α-amino-ω-lactams from α-nitro-ω-lactams by catalytic hydrogenation at superatmospheric pressure and a temperature of up to 150° C., the improvement which comprises forming a water-soluble salt of the aci-form of α-nitro-ω-lactams and hydrogenating this salt to produce α-amino-ω-lactams.

2. The process of claim 1 wherein said salt is the ammonium salt.

3. The process of claim 2 wherein said salt is prepared by dissolving the α-nitro-ω-lactam in an aqueous solution of ammonia.

4. The process according to claim 1, wherein said salt is formed by dissolving the α-nitro-ω-lactam in an aqueous solution of ammonia and subsequently adding to this solution at least the equivalent amount of α-amino-ω-lactam.

5. The process according to claim 3, wherein free ammonia is expelled from the salt solution before the latter is reduced.

6. The process of claim 1, wherein said solution contains 30–45% nitrolactam.

7. The process of claim 1, wherein said α-nitro-ω-lactam is selected from the group consisting of α-nitro-ε-caprolactam and α-nitro-θ-oenantholactam.

References Cited in the file of this patent

UNITED STATES PATENTS 2,933,491  Klager ---------------- Apr. 19, 1960

FOREIGN PATENTS 1,193,279  France ---------------- Nov. 2, 1959

OTHER REFERENCES

Noller: Chemistry of Organic Compounds, 2nd ed., pp. 260–61 (Saunders) (1957).

Noller: Chemistry of Organic Compounds, 2nd ed., p. 262 (1957) (Saunders).

UNITED STATES PATENT OFFICE
CERTIFICATE OF CORRECTION

Patent No. 3,052,670            September 4, 1962

Johannes H. Ottenheym et al.

It is hereby certified that error appears in the above numbered patent requiring correction and that the said Letters Patent should read as corrected below.

Column 4, line 47, for "-θ-" read -- -ζ- --.

Signed and sealed this 26th day of February 1963.

(SEAL)
Attest:

ESTON G. JOHNSON            DAVID L. LADD
Attesting Officer            Commissioner of Patents